United States Patent [19]

Jaksa et al.

[11] Patent Number: 4,715,103
[45] Date of Patent: Dec. 29, 1987

[54] METHOD OF PRODUCING INTERFERENCE CONNECTION BETWEEN A FLUID LINE AND A FLUID INJECTOR

[75] Inventors: Tibor S. Jaksa, Pontiac; Richard F. Norton; Kenneth W. Hall, both of Peoria; Stephen J. Butler, Chillicothe; Craig C. Chicoine; Wilford L. Bienz, both of Bloomington, all of Ill.

[73] Assignee: Caterpillar Inc., Peoria, Ill.

[21] Appl. No.: 893,062

[22] Filed: Aug. 4, 1986

[51] Int. Cl.⁴ .............................................. B23P 15/00
[52] U.S. Cl. ........................ 29/156.4 R; 29/157 T; 29/445; 29/523; 239/533.2; 285/382.4
[58] Field of Search .................. 29/523, 512, 157 T, 29/156.4 R, 157 C, 525, 445; 285/382.4; 239/86, 533.3, 533.8, 533.2

[56] References Cited

U.S. PATENT DOCUMENTS

| | | | |
|---|---|---|---|
| 611,802 | 10/1898 | Taylor | 29/512 UX |
| 1,834,058 | 12/1931 | Herr . | |
| 2,172,556 | 9/1939 | Edwards . | |
| 2,252,274 | 8/1941 | Rossheim et al. | 285/382.4 |
| 2,357,748 | 9/1944 | Lyon | 29/512 |
| 2,365,752 | 12/1944 | Edwards . | |
| 2,370,804 | 3/1945 | Laurent | 29/523 UX |
| 3,159,350 | 12/1964 | Mangold . | |
| 3,224,684 | 12/1965 | Roosa . | |
| 3,255,974 | 6/1966 | Roosa . | |
| 3,331,117 | 7/1967 | Jacobellis | 29/445 X |
| 3,431,895 | 3/1969 | Bailey . | |
| 3,584,101 | 6/1971 | Martz | 29/445 X |
| 3,695,641 | 10/1972 | Engelking et al. | 285/382.4 X |
| 3,750,960 | 8/1973 | Back et al. . | |
| 3,860,178 | 1/1975 | Seifert . | |
| 3,913,421 | 10/1975 | Hawkins | 29/523 X |
| 4,111,370 | 9/1978 | Chelgren | 239/533.3 |
| 4,163,521 | 8/1979 | Roosa | 239/86 |
| 4,266,728 | 5/1981 | Voss et al. | 239/533.8 |
| 4,445,713 | 5/1984 | Bruning | 285/14 |
| 4,502,196 | 3/1985 | Kupper et al. | 29/445 X |
| 4,601,086 | 7/1986 | Gerlach | 29/156.4 R |

FOREIGN PATENT DOCUMENTS 2124699 2/1984 United Kingdom .

OTHER PUBLICATIONS

SAE Paper No. 830666 "The Pencil Nozzle-Past, Present & Future", Published 2-28-83, International Congress & Exposition, Detroit, Mich., by L. E. Tolan et al.
Engineering Graphics, 4th Ed., by J. S. Rising et al., Wm. C. Brown Company, Publishers (1970), Excerpts: pp. 230-234, 365-366.
Basic Manufacturing Processes, by H. C. Kazanas et al., McGraw-Hill Book Company (1981), Excerpts: pp. 327-328.
Tool & Manufacturing Engineers Handbook, 4th Ed., vol. II, by: Society of Manufacturing Engineers (1984), Excerpts: pp. 14-1 to 14-21.
Tool & Manufacturing Engineers Handbook, 4th Ed., vol. I, by: Society of Manufacturing Engineers (1983), Excerpts: pp. 9-107 to 9—134.
"The Cat 3208 Diesel Engine" Catalog No. LECT3131, Published: 1983 by: Caterpillar Inc.

*Primary Examiner*—Charlie T. Moon
*Attorney, Agent, or Firm*—Anthony N. Waloch

[57] ABSTRACT

Conventional joints between a fluid line and a body of a fluid injector are typically threaded or brazed. Such threaded joints are sometimes too bulky for certain engine compartments of limited space and such brazed joints are sometimes difficult to make with repeatable high quality.

The present invention provides a relatively compact and inexpensive sealed joint for a fluid injector which includes a housing, a body, and a fluid line. The sealed joint is solely formed by an interference fit directly between an end portion of the fluid line and both the housing and an end portion of the body.

9 Claims, 8 Drawing Figures

METHOD OF PRODUCING INTERFERENCE CONNECTION BETWEEN A FLUID LINE AND A FLUID INJECTOR

DESCRIPTION

1. Technical Field

This invention relates generally to a fluid injector and, more particularly, to a sealed joint between a fluid line and the fluid injector.

2. Background Art

As shown in U.S. Pat. No. 3,224,684 issued to V. D. Roosa on Dec. 21, 1965, some fuel injection nozzles each have a side-entry fuel inlet stud which is brazed or welded to a body of the fuel injection nozzle. Such inlet connections are desirable because the inlet stud is easily bendable to adapt the fuel injection nozzle to a variety of engine applications where the free space allotted for location of the fuel injection nozzle is very limited.

One disadvantage of the above brazed or welded connection is that it is difficult to repeatedly ensure that the brazing or welding material, such as silver or copper solder, adequately penetrates the joint. Consequently, a significant portion of fuel injection nozzles manufactured generally according to this method fail to pass a required fuel leakage test and consequently must be either reworked or scrapped. Another disadvantage of the above brazed or welded connection is that the heat applied during brazing or welding can distort and consequently prevent proper operation of the needle check guide and/or the needle check of the fuel injection nozzle if the needle check guide was already made integral with the body. One approach to solving this problem is shown in U.S. Pat. No. 3,255,974 issued to V. D. Roosa on June 14, 1966 where a separate precision-ground guide for the needle check is installed in the body after the inlet stud has been brazed to the body. However, providing the needle check guide as a separate part relative to the body makes this approach more costly than an integral design.

Another approach to minimizing the above problems is to eliminate such brazed or welded joints as shown in U.S. Pat. No. 4,163,521 issued to V. D. Roosa on Aug. 7, 1979. In the above disclosure, an inlet fitting is shrunk or press fit around the body without welding. A fuel supply line is then connected to the inlet fitting by a collar and a threaded tubular fitting. Other types of threaded connections between a fuel supply line and the body of a fuel injection nozzle are shown in U.S. Pat. No. 2,365,752 issued to H. C. Edwards on Dec. 26, 1944 and U.S. Pat. No. 4,266,728 issued to J. R. Voss et al. on May 12, 1981.

A disadvantage with all of these types of threaded connections is that their size may make the fuel injection nozzle exceed the space available for a particular installation. For example, often there is not enough room in an engine compartment, due to the crowding presence of a valve train and/or the limited size of a valve-train cover, to accommodate such threaded connections which must be large enough in size to withstand high-pressure fuel leakage.

The present invention is directed to overcoming one or more of the problems as set forth above.

DISCLOSURE OF THE INVENTION

In one aspect of the present invention, a fluid injector is disclosed including a housing having first and second bores intersecting one another, a fluid line having an internal passage and an end portion, and a body having an end portion. The fluid line end portion is disposed in the housing second bore and is located substantially flush with the housing first bore. The body end portion is disposed in the housing first bore and abuts the fluid line end portion according to a predetermined interference fit with both the fluid line end portion and the housing first bore. The interference fit maintains a fluid-sealed interface between the body end portion and both the fluid line end portion and the housing first bore. Moreover, the interference fit positively retains the fluid line end portion between the housing and the body end portion.

In another aspect of the present invention, a method is disclosed of manufacturing a fluid injector including a body having an exterior sealing portion of a predetermined outside diameter, a fluid line having an internal passage and an end portion, and a housing having first and second bores intersecting one another wherein the housing first bore has an interior sealing portion and the housing second bore includes an internal shoulder positioned adjacent to and facing the interior sealing portion of the housing first bore. The method includes the steps of inserting the fluid line end portion into the housing second bore, forming the fluid line end portion with respect to the internal shoulder so that the fluid line end portion forms a flange portion seated against the internal shoulder, and removing any excess of the flange portion which inwardly extends inside the interior sealing portion of the housing first bore so that the remaining flange portion of the fluid line is substantially flush with a predetermined inside diameter of the housing first bore. The inside diameter of the housing first bore is chosen to be less than the magnitude of the outside diameter of the body exterior sealing portion. The method further includes the steps of aligning the exterior sealing portion of the body with the housing first bore and inserting the exterior sealing portion of the body into the interior sealing portion of the housing first bore. Consequently, a fluid-sealed interference fit is formed between the exterior sealing portion of the body and both the flange portion of the fluid line and the interior sealing portion of the housing.

The present invention provides a compact and relatively inexpensive sealed joint and method of assembly between a fluid line and a fluid injector.

BEST MODE FOR CARRYING OUT THE INVENTION

Referring to FIGS. 1-7, wherein similar reference characters designate similar elements or features throughout those figures, there is shown one exemplary embodiment of the fluid injector of the present invention. Although the fluid injector and method of manufacture are illustrated for a fuel injection nozzle adapted for direct injection of fuel into an internal combustion engine, it should be kept in mind that the invention is also applicable to other types of fluid injectors including unit-fuel-pump injectors requiring inlet and/or outlet fluid line connections.

Figure 1:
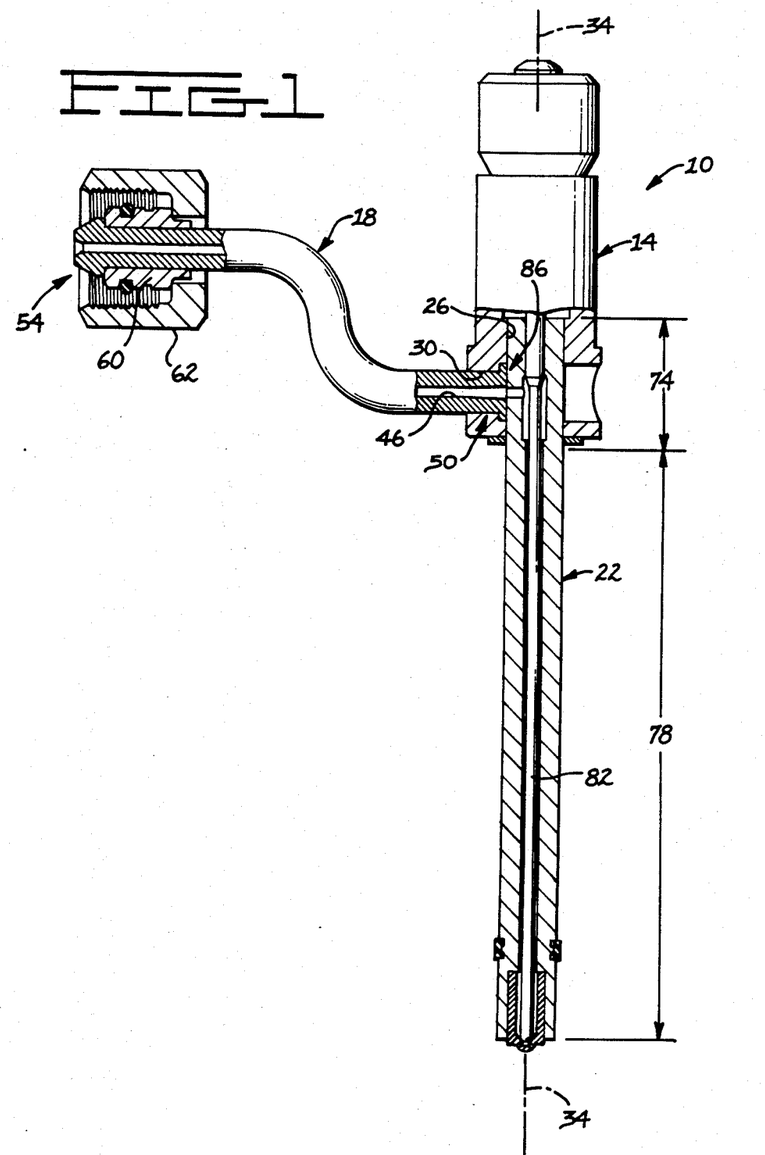
FIG. 1 is a diagrammatic partial cross-sectional side elevational view of one exemplary embodiment of the improved fluid injector.
Figure 2:
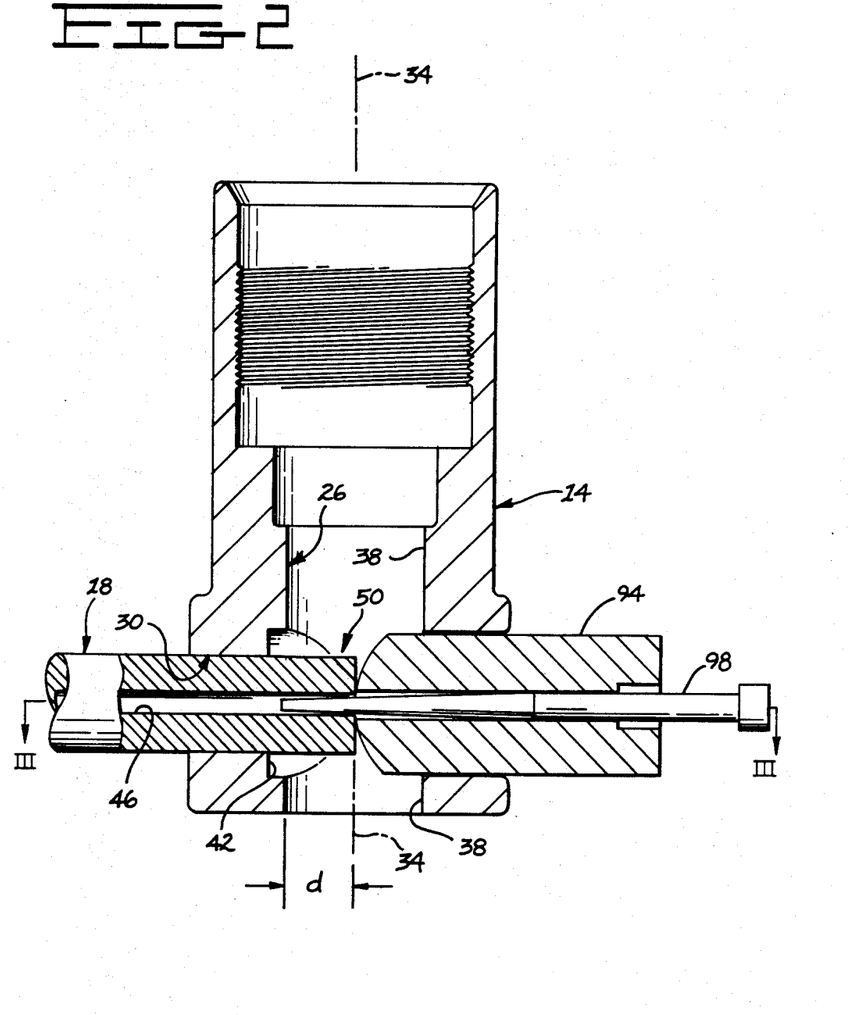
FIG. 2 is a diagrammatic enlarged partial cross-sectional view of one initial step in the method of manufacture of the fluid injector shown in FIG. 1.

Referring to FIG. 1, the fluid injector 10 includes a housing 14, a side-entry fluid supply line 18, and a generally cylindrical and elongated body 22. As shown in FIG. 2, the housing 14 includes first and second bores 26,30 intersecting one another wherein, for example, the housing first bore 26 is a generally axial bore and the housing second bore 30 is a generally radial bore with respect to a central longitudinal axis 34 of the body 22. The housing axial bore 26 has a sealing interior portion 38 which is generally cylindrical except for its intersection with the housing radial bore 30.

The housing radial bore 30 includes an internal annular shoulder 42 which is positioned adjacent to and faces the housing axial bore 26. The internal annular shoulder 42 has an outside diameter that is larger than the diameter of the housing radial bore 30. The internal annular shoulder 42 is preferably machined or otherwise formed as a stepped counterbore of the housing radial bore 30. Alternatively, the internal annular shoulder 42 may be machined or otherwise formed as a frusto-conical countersink of the housing radial bore 30.

Figure 6:
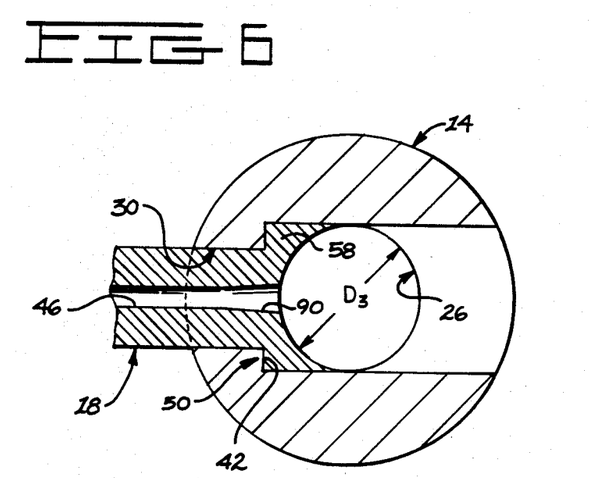
FIG. 6 is a diagrammatic cross-sectional view taken along line VI—VI of FIG. 5 after a finishing tool has been removed.
Figure 8:
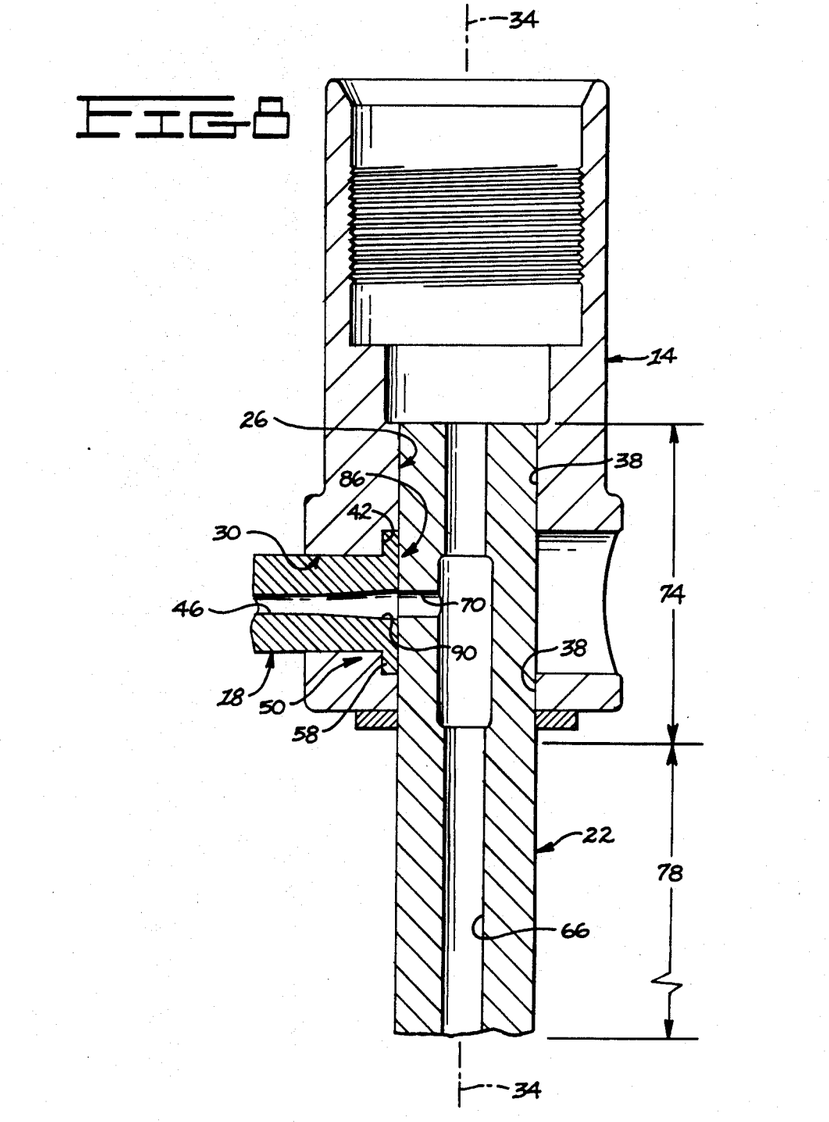
FIG. 8 is a diagrammatic cross-sectional view similar to FIG. 7 but showing another step in the method of manufacture of the fluid injector of FIG. 1.

Referring to FIG. 1, the fluid line 18 is preferably made from seamless and bendable tubing derived from a relatively ductile material such as low carbon steel. The fluid line 18 has an internal passage 46, an end portion 50, and an opposite end portion 54. As shown in FIGS. 6 and 8, a free end of the fluid line end portion 50 includes an integral flange portion 58 which is generally complementarily shaped with respect to the internal annular shoulder 42. The fluid line end portion 50 is disposed in the housing radial bore 30 such that the flange portion 58 is permanently seated against the internal annular shoulder 42 and located substantially flush with respect to the sealing interior portion 38 of the housing axial bore 26. As shown in FIG. 1, the opposite end portion 54 of the fluid line 18 is swaged to retain conventional elements including a collar 60 and a freely rotatable coupling nut 62 positioned around the fluid line 18.

Figure 7:
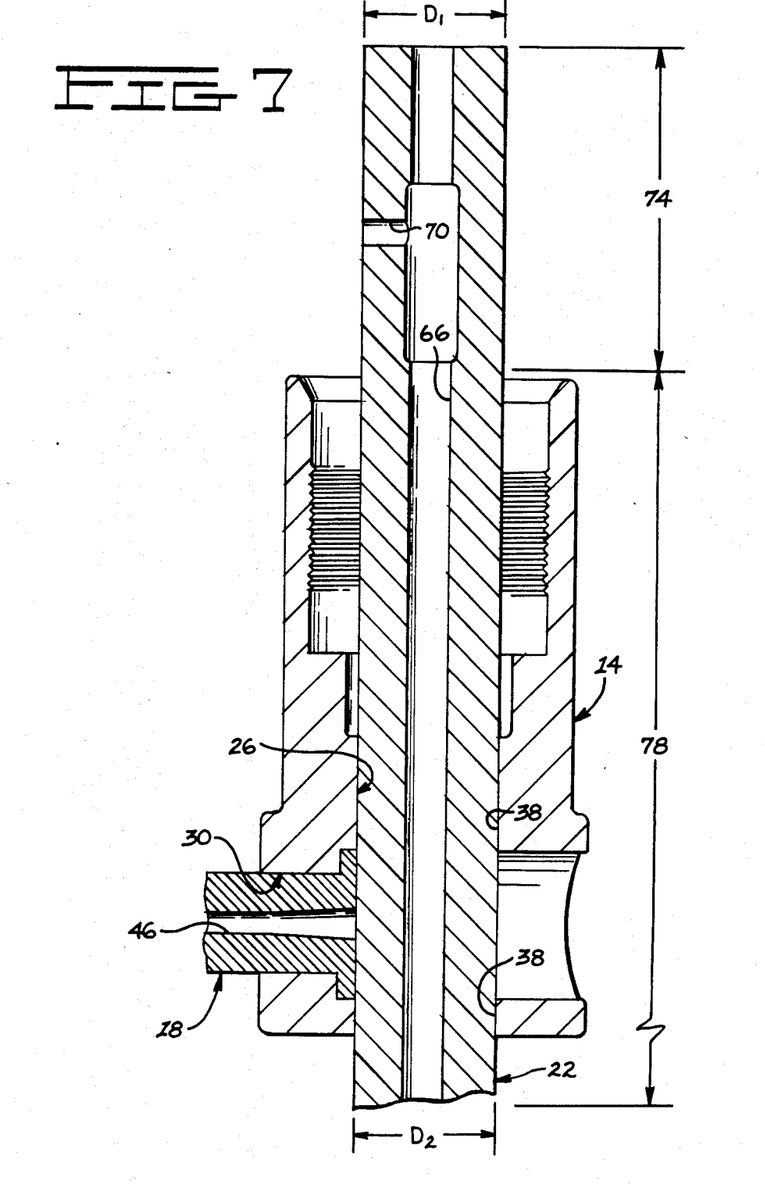
FIG. 7 is a diagrammatic cross-sectional view similar to FIG. 5 but showing another step in the method of manufacture of the fluid injector of FIG. 1.

Referring to FIGS. 1, 7, and 8, the body 22 includes first and second bores 66,70 arranged in continuous fluid communication with one another, a cylindrical end portion or sealing exterior portion 74 which is precision ground or otherwise formed to a predetermined first outside diameter $D_1$, another cylindrical end portion or another exterior portion 78 which is formed to a predetermined second outside diameter $D_2$, and an axially movable needle check 82. For example, the body first bore 66 is a generally axial bore and the body second bore 70 is a generally radial bore with respect to the longitudinal axis 34 of the body 22.

In their free state, the magnitude of the first outside diameter $D_1$ of the sealing exterior portion 74 of the body 22 is chosen to be greater than the magnitude of a predetermined inside diameter $D_3$ (FIG. 6) of the sealing interior portion 38 of the housing axial bore 26. Moreover, in their free state, the magnitude of the second outside diameter $D_2$ of the another exterior portion 78 of the body 22 is chosen to be smaller than the magnitude of the inside diameter $D_3$ of the sealing interior portion 38 of the housing axial bore 26. Consequently, the second outside diameter $D_2$ is smaller than the first outside diameter $D_1$ when the body 22 is in its free state. Alternatively, the second outside diameter $D_2$ may be made the same size as the first outside diameter $D_1$. The sealing exterior portion 74 of the body 22 is disposed in the housing axial bore 26 and abuts the flange portion 58 of the fluid line 18 according to a predetermined interference fit with both the flange portion 58 and the sealing interior portion 38 of the housing axial bore 26. The interference fit creates a hoop tension of a sufficient magnitude which maintains a semi-cylindrical fluid-sealed interface or joint 86 directly between the sealing exterior portion 74 of the body 22 and both the flange portion 58 of the fluid line 18 and the sealing interior portion 38 of the housing axial bore 26.

The body radial bore 70 is generally aligned and arranged in continuous fluid communication with the internal passage 46 of the fluid line 18. As shown in FIGS. 6 and 8, the diameter of an end portion 90 of the fluid line internal passage 46 adjacent to the internal annular shoulder 42 of the housing radial bore 30 is preferably gradually increased towards and adjacent to the body radial bore 70 so that its inside diameter exceeds the inside diameter of the body radial bore 70 by a predetermined amount. Such an arrangement helps to accommodate limited misalignment, if any, between the fluid line internal passage 46 and the body radial bore 70 after telescopic assembly of the body 22 within the housing 14.

Referring to FIG. 1, the movable needle check 82 is disposed in the body axial bore 66 and is biased to a closed position by a spring (not shown) disposed in the housing 14.

METHOD OF MANUFACTURE

Preferably, the ductile fluid line 18 is already bent to a preselected shape suitable for its intended working application. Moreover, the opposite end portion 54 is already swaged and thereby connected to the collar 60 which already retains the coupling nut 62 around the fluid line 18. Referring to FIG. 2, an initial step in the manufacture of the fluid injector 10 is radially inserting the end portion 50 of the fluid line 18 into an end portion of the housing radial bore 30 according to a predetermined slip fit. Alternatively, the insertion may be made according to a predetermined interference fit. The insertion is made so that the free end of the fluid line end portion 50 extends a predetermined radial depth d, greater than zero, inside the sealing interior portion 38 of the housing axial bore 26. Such insertion establishes continuous fluid communication between the fluid line internal passage 46 and the housing axial bore 26.

Figure 3:
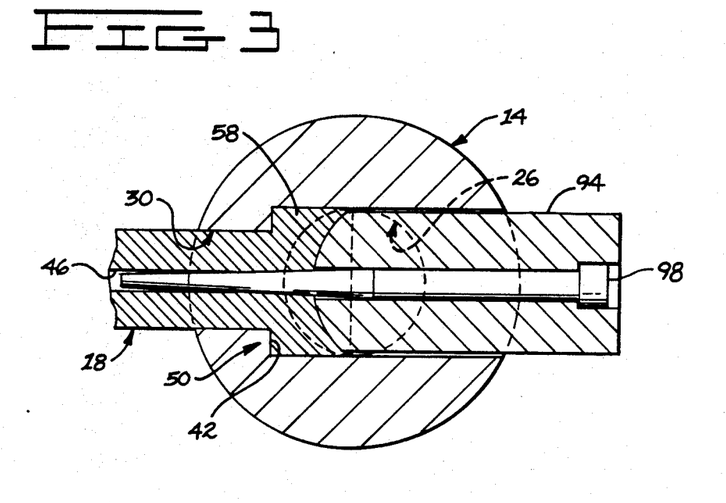
FIG. 3 is a diagrammatic cross-sectional view taken along line III—III of FIG. 2 but showing another step in the method of manufacture of the fluid injector shown in FIG. 1.

After fixing the fluid line 18 in that position relative to the housing 14, the next step is forming the fluid line end portion 50 with respect to the internal annular shoulder 42 so that the fluid line end portion 50 forms the generally complementary flange portion 58, shown in FIG. 3, which is permanently seated against the internal annular shoulder 42. For example, this step includes the step of swaging, with a swaging tool 94, the fluid line end portion 50 against the internal annular shoulder 42. Thus, for the step of swaging, the depth d is generally chosen to be of a magnitude sufficient to provide adequate but not overly excessive filling of the internal annular shoulder 42 with the swaged material of the fluid line end portion 50.

As shown in FIGS. 2 and 3, the step of swaging the fluid line end portion 50 against the internal shoulder 42 includes the step of simultaneously maintaining fluid communication between the fluid line internal passage 46 and the housing first bore 26. Moreover, this step includes the step of gradually increasing the diameter of the end portion 90 of the fluid line internal passage 46 towards and adjacent to the housing axial bore 26. Furthermore, this step includes the step of temporarily inserting a tapered mandrel 98 into the end portion 90 of the fluid line internal passage 46 adjacent to the housing axial bore 26 and maintaining the mandrel 98 therein until the swaging step is completed.

Figure 4:
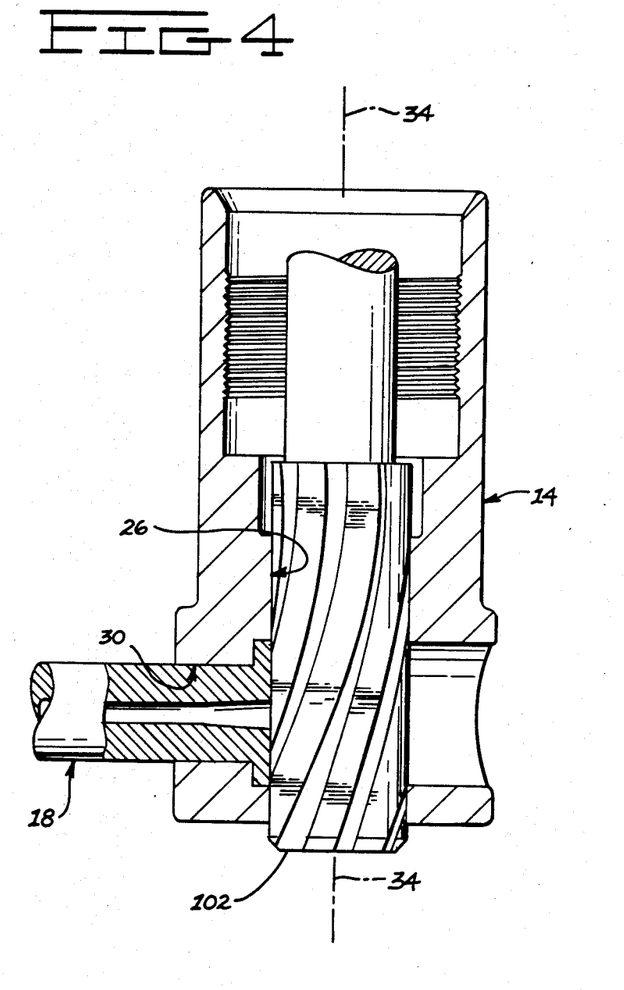
FIG. 4 is a diagrammatic partial cross-sectional view similar to FIG. 2 but showing another step in the method of manufacture of the fluid injector shown in FIG. 1.
Figure 5:
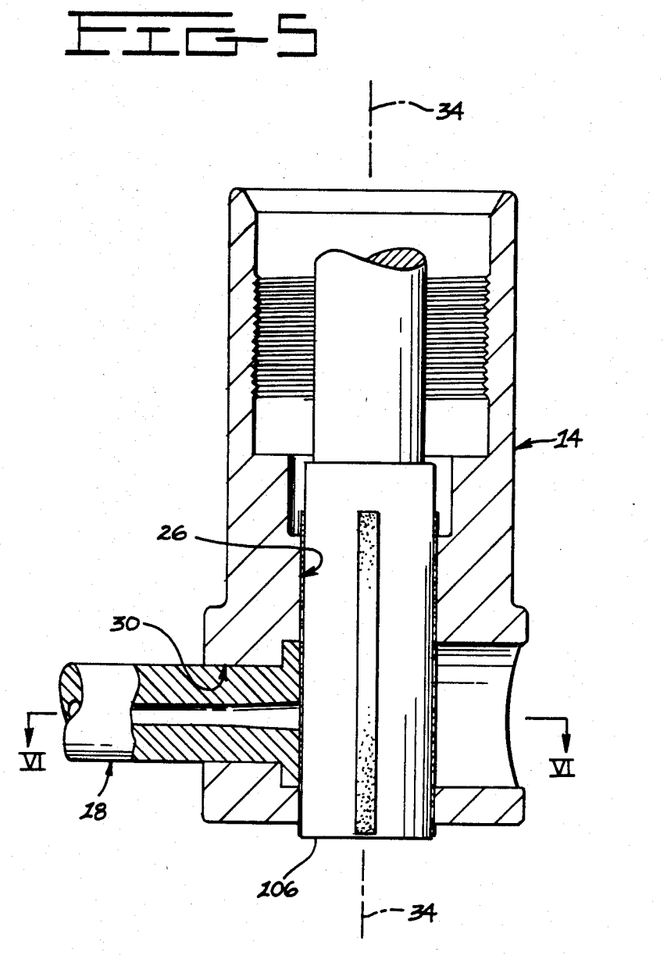
FIG. 5 is a diagrammatic partial cross-sectional view similar to FIG. 4 but showing another step in the method of manufacture of the fluid injector shown in FIG. 1.

As shown in FIGS. 4 and 5, the next step is removing any excess of the flange portion 58 which inwardly extends inside the sealing interior portion 38 of the housing axial bore 26. This step includes the step of machining or otherwise forming the sealing interior portion 38 of the housing axial bore 26 to the predetermined inside diameter $D_3$ (FIG. 6) so that the flange portion 58 of the fluid line 18 is substantially flush or uniform with the housing axial bore 26. This step, for example, may include the steps of reaming with a reaming tool 102 and then finishing the sealing interior portion 38 of the housing axial bore 26 with a honing, burnishing, or internal grinding tool 106 in order to achieve a desired roundness and surface finish. After the step of finishing the housing axial bore 26, the housing axial bore 26 and the fluid line internal passage 46 are thoroughly flushed with a suitable liquid (such as cutting tool coolant) to remove any machining chips or other debris therein.

As shown in FIG. 7, the next step is axially aligning and piloting the another exterior portion 78 of the body 22 into the housing axial bore 26 according to a predetermined slip fit. If necessary, this step includes the step of angularly rotating the body 22 about the longitudinal axis 34 so that the orientation of the body radial bore 30 is fixed generally in the same plane as the fluid line internal passage 46.

As shown in FIG. 8, the next step is axially inserting the aligned sealing exterior portion 74 of the body 22 into the sealing interior portion 38 of the housing axial bore 26. This step of insertion may be accomplished by a drive fit, force fit, or shrink fit between the mating portions 74,38 of the body 22 and the housing 14. This insertion is made to a predetermined axial depth so that the fluid line internal passage 46 continuously and permanently communicates with the body radial bore 70 and so that a fluid-sealed interference fit is formed directly between the sealing exterior portion 74 of the body 22 and both the flange portion 58 of the fluid line 18 and the sealing interior portion 38 of the housing axial bore 26. In the alternative embodiment where the second outside diameter $D_2$ is made the same size as the first outside diameter $D_1$, the sealing exterior portion 74 of the body 22 may be inserted directly into the sealing interior portion 38 at the opposite end of the housing axial bore 26. In any event, the flange portion 58 of the fluid line 18 is thereafter positively retained against the internal annular shoulder 42 by the interference fit with the sealing exterior portion 74 of the body 22. Other components, such as the needle check 82 and its associated spring (not shown), are then assembled to complete the fluid injector 10.

INDUSTRIAL APPLICABILITY

While the manufacture and operation of the present invention is believed clearly apparent from the foregoing description, further amplification will be made in the following brief summary of such manufacture and operation for an exemplary fuel injection nozzle 10 shown in FIG. 1.

In operation a fluid, such as fuel, is pressurized and delivered by a pump (not shown) into the internal passage 46 of the fluid supply line 18 and through the radial and axial bores 70,66 of the body 22. When the fluid pressure acting on a differential area of the movable needle check 82 exceeds the bias force of the spring (not shown) in the housing 14, the needle check 82 axially moves inwardly away from its closed position to open fluid flow through one or more injection orifices which then spray the fluid into, for example, an engine combustion chamber (not shown).

The interference fit maintains the fluid-sealed interface or joint 86 directly between the sealing exterior portion 74 of the body 22 and both the flange portion 58 of the fluid line 18 and the sealing interior portion 38 of the housing axial bore 26. The Various exemplary dimensional parameters of an actually bench-tested embodiment of the present invention are approximately as follows, expressed in millimeters:

| | |
|---|---|
| first outside diameter, $D_1$, of body end portion 74 | 9.652 mm ± 0.002 mm |
| axial length of body end portion 74 | 24.0 mm |
| second outside diameter, $D_2$, of body another end portion 78 | 9.525 mm ± 0.050 mm |
| inside diameter, $D_3$, of sealing interior portion 38 of housing axial bore 26 | 9.627 mm ± 0.003 mm |
| axial length of sealing interior portion 38 | 19.0 mm |
| radial depth, d | 5.7 mm |
| outside diameter of fluid line 18 | 6.35 mm + 0.13 mm − 0.00 mm |
| inside diameter of internal passage 46 of fluid line 18 | 1.60 mm ± 0.03 mm |
| maximum inside diameter of end portion 90 of of fluid line internal passage 46 | 1.85 mm + 0.08 mm − 0.00 mm |
| length of end portion 90 | 16.0 mm |
| diameter of housing radial bore 30 (slip fit) | 6.53 mm ± 0.05 mm |
| diameter of housing radial bore 30 (interference fit) | 6.30 mm ± 0.05 mm |
| diameter of internal annular shoulder 42 | 9.00 mm |

-continued

| | |
|---|---|
| diameter of body radial bore 70 | 1.80 mm ± 0.13 mm |

In the above bench-tested embodiment, the fluid-sealed interface 86 successfully withstood an internal fluid (fuel) pressure of about 68,900 kilopascals (10,000 pounds per square inch) without leaking.

Other aspects, objects, and advantages of this invention can be obtained from a study of the drawings, the disclosure, and the appended claims.

We claim:

1. A method of manufacturing a fluid injector including a body having a sealing exterior portion of a predetermined outside diameter, a fluid line having an internal passage and an end portion, and a housing having first and second bores intersecting one another wherein the housing first bore has a sealing interior portion and the housing second bore includes an internal shoulder positioned adjacent to and facing the sealing interior portion of the housing first bore, said method comprising the steps of:

inserting the end portion of the fluid line into an end portion of the housing second bore so that the fluid line end portion inwardly extends a predetermined depth, greater than zero, inside the sealing interior portion of the housing first bore;

forming the fluid line end portion with respect to the internal shoulder so that the fluid line end portion forms a generally complementary flange portion seated against the internal shoulder;

removing any excess of the flange portion which inwardly extends inside the sealing interior portion of the housing first bore so that the remaining flange portion of the fluid line is substantially flush with a predetermined inside diameter of the housing first bore, said predetermined inside diameter of the housing first bore being less than the magnitude of the outside diameter of the body sealing exterior portion;

aligning the sealing exterior portion of the body with the housing first bore; and inserting the sealing exterior portion of the body into the sealing interior portion of the housing first bore so that a fluid-sealed interference fit is formed between the sealing exterior portion of the body and both the flange portion of the fluid line and the sealing interior portion of the housing first bore.

2. The method of claim 1 wherein the step of forming the fluid line end portion with respect to the internal shoulder includes the step of swaging the fluid line end portion against the internal shoulder.

3. The method of claim 1 wherein the body further includes first and second bores arranged in continuous fluid communication with one another, said step of aligning the sealing exterior portion of the body with the housing first bore includes the step of angularly rotating the body so that the body second bore is fixedly orientated generally in the same plane as the fluid line internal passage, and said step of inserting the sealing exterior portion of the body into the sealing interior portion of the housing first bore establishes continuous fluid communication between the fluid line internal passage and the body second bore.

4. The method of claim 1 wherein the step of inserting the fluid line end portion into the housing second bore establishes continuous fluid communication between the fluid line internal passage and the housing first bore and wherein the step of forming the fluid line end portion with respect to the internal shoulder includes the step of simultaneously maintaining fluid communication between the fluid line internal passage and the housing first bore.

5. The method of claim 4 wherein the step of maintaining fluid communication between the fluid line internal passage and the housing first bore includes the step of gradually increasing the diameter of an end portion of the fluid line internal passage towards and adjacent to the housing first bore.

6. The method of claim 5 wherein the step of gradually increasing the diameter of the end portion of the fluid line internal passage adjacent to the housing first bore includes the step of temporarily inserting a tapered mandrel into the end portion of the fluid line internal passage adjacent to the housing first bore.

7. The method of claim 1 wherein the step of removing any excess of the flange portion which inwardly extends inside the sealing interior portion of the housing first bore includes the steps of reaming and finishing the sealing interior portion of the housing first bore to a diameter substantially equal to the predetermined inside diameter.

8. A method of manufacturing a fluid injector adapted for an internal combustion engine including a body having a sealing exterior portion of a predetermined first outside diameter, another exterior portion of a predetermined second outside diameter which is smaller than the first outside diameter, and first and second bores arranged in continuous fluid communication with one another, a fluid line having an internal passage and an end portion, and a housing having first and second bores intersecting one another wherein the housing first bore has a sealing interior portion and the housing second bore includes an internal shoulder positioned adjacent to and facing the sealing interior portion of the housing first bore, said method comprising the steps of:

inserting the end portion of the fluid line into an end portion of the housing second bore so that the fluid line end portion inwardly extends a predetermined depth, greater than zero, inside the sealing interior portion of the housing first bore;

swaging the fluid line end portion against the internal shoulder so that the fluid line end portion forms a generally complementary flange portion seated against the internal shoulder;

machining the sealing interior portion of the housing first bore to a predetermined inside diameter so that the flange portion of the fluid line is substantially flush with the housing first bore, said predetermined inside diameter of the housing first bore being less than the magnitude of the first outside diameter of the body sealing exterior portion and greater than the magnitude of the second outside diameter of the body another exterior portion;

piloting the another exterior portion of the body into the housing first bore;

angularly rotating the body so that the body second bore is fixedly oriented generally in the same plane as the fluid line internal passage; and inserting the sealing exterior portion of the body into the sealing interior portion of the housing first bore so that the fluid line internal passage continuously communicates with the body second bore and so that a fluid-sealed interference fit is formed between the sealing exterior portion of the body and both the flange portion of the fluid line and the sealing interior portion of the housing first bore.

9. A method of manufacturing a fuel injection nozzle adapted for an internal combustion engine including a generally cylindrical body having a sealing exterior portion of a predetermined first outside diameter, another exterior portion of a predetermined second outside diameter which is smaller than the first outside diameter, and axial and radial bores arranged in continuous fluid communication with one another, a side-entry fuel line having an internal passage and an end portion, and a housing having axial and radial bores intersecting one another wherein the housing axial bore has a sealing interior portion and the housing radial bore includes an internal annular shoulder positioned adjacent to and facing the sealing interior portion of the housing axial bore, said method comprising the steps of:

radially inserting the end portion of the fuel line into an end portion of the housing radial bore so that the fuel line end portion fixedly extends a predetermined radial depth, greater than zero, inside the sealing interior portion of the housing axial bore;

swaging the fuel line end portion against the internal annular shoulder so that the fuel line end portion forms a generally complementary flange portion seated against the internal annular shoulder;

machining the sealing interior portion of the housing axial bore to a predetermined inside diameter so that the flange portion of the fuel line is substantially flush with the housing axial bore, said predetermined inside diameter of the housing axial bore being less than the magnitude of the first outside diameter of the body sealing exterior portion and greater than the magnitude of the second outside diameter of the body another exterior portion;

axially piloting the another exterior portion of the body into the housing axial bore;

angularly rotating the body so that the body radial bore is fixedly oriented generally in the same plane as the fuel line internal passage; and     axially inserting the sealing exterior portion of the body into the sealing interior portion of the housing axial bore so that the fuel line internal passage communicates with the body radial bore and so that a fluid-sealed interference fit is formed directly between the sealing exterior portion of the body and both the flange portion of the fuel line and the sealing interior portion of the housing axial bore, said flange portion of the fuel line being positively retained against the internal annular shoulder by the interference fit with the sealing exterior portion of the body.

* * * * *